United States Patent [19]
Omura

[11] Patent Number: 6,104,542
[45] Date of Patent: Aug. 15, 2000

[54] WIDE-ANGLE EYEPIECE LENS WITH LARGE EYE RELIEF

[75] Inventor: Yasuhiro Omura, Tokyo, Japan

[73] Assignee: Nikon Corporation, Tokyo, Japan

[21] Appl. No.: 09/020,877

[22] Filed: Feb. 9, 1998

[30] Foreign Application Priority Data

Feb. 10, 1997 [JP] Japan .................................. 9-039721

[51] Int. Cl.$^7$ .................................................. G02B 25/00
[52] U.S. Cl. ............................ 359/643; 359/644; 359/645
[58] Field of Search ............................. 359/661, 643–645

[56] References Cited

U.S. PATENT DOCUMENTS

| | | | |
|---|---|---|---|
| 5,619,379 | 4/1997 | Fukumoto | 359/644 |
| 5,671,092 | 9/1997 | Estelle | 359/645 |
| 5,815,317 | 9/1998 | Omura | 359/645 |
| 5,872,658 | 2/1999 | Ori | 359/677 |

*Primary Examiner*—Georgia Epps
*Assistant Examiner*—Michael A Lucas
*Attorney, Agent, or Firm*—Klarquist Sparkman Campbell Leigh & Whinston, LLP

[57] ABSTRACT

Wide-angle eyepiece lenses for a microscope are disclosed. A representative lens comprises, from the object side to the eye side, a first lens group with positive refractive power, a second lens group with a concave surface facing the object side and a surface (closest to the object side) contacting air, and a third lens group with positive refractive power and at least one surface contacting air. One or both of the surface of the second lens group closest to the object side and the air-contacting surface of the third lens group is aspherical.

12 Claims, 12 Drawing Sheets

WIDE-ANGLE EYEPIECE LENS WITH LARGE EYE RELIEF

FIELD OF THE INVENTION

This invention relates to eyepiece lenses having a wide field of view, and particularly to eyepiece lenses having a wide field of view and a relatively large eye relief.

BACKGROUND OF THE INVENTION

Due to their large F-number, contemporary microscope eyepiece lenses generate little spherical aberration at the image plane and require little aberration correction. Consequently, many conventional eyepiece lenses consist generally of lenses having spherical surfaces.

It is desirable, however, to widen the field of view of the typical microscope eyepiece lens. Also, to enable the user to look through the eyepiece lens while wearing eyeglasses, it is desirable to increase the eye relief (i.e., the distance between the eyepiece lens and the eye point). As the field of view and the eye relief of an eyepiece lens are increased, distortion and spherical aberration of the pupil tend to rapidly increase, posing the need to use aspherical lenses to correct these aberrations. Eyepiece lenses of this type are disclosed, for example, in Japanese laid-open patent document nos. SHO 62-255914, HEI 5-215974, HEI 7-270688, HEI 7-281108, and HEI 8-43749.

Aberration correction in eyepiece lenses requires simultaneous correction of both: (1) aberrations, at the image plane, in the image formed by rays traveling from the entrance pupil (the so-called "inherent aberrations" of the eyepiece lens), and (2) aberrations at the pupil position, as would be formed by light traveling from the image plane (the so-called "pupil aberrations"). Inherent aberrations and pupil aberrations are not completely independent, however, and cannot be independently corrected. Thus, it has been impossible to sufficiently correct these aberrations with an eyepiece lens comprising only spherical surfaces.

Even with conventional eyepiece lenses containing aspherical lenses, while some aberrations have been well corrected, other aberrations are often insufficiently corrected, or have even increased relative to eyepiece lenses without aspherical surfaces.

As objective lenses have been developed having increased numerical aperture, demand has increased for such eyepiece lenses having, in addition, improved resolution at the edge of the field of view. With conventional eyepiece lenses with aspherical surfaces, attempts to correct coma sufficiently to obtain high resolution to the edge of the field of view have been unsuccessful.

In addition, when changing objective lenses on the microscope, or when a relay lens or the like is used between the objective lens and the eyepiece lens, the position of the entrance pupil of the eyepiece lens typically changes. If the coma of the eyepiece lens is not adequately corrected, astigmatism will change significantly with changes in the entrance pupil position, which deteriorates resolution at the edge of the field of view.

OBJECTS AND SUMMARY OF THE INVENTION

In view of the shortcomings of conventional microscope eyepiece lenses summarized above, this invention provides microscope wide-angle eyepiece lenses that comprise multiple lenses including at least one aspherical lens. The eyepiece lenses adequately correct the various inherent eyepiece lens aberrations such as distortion, astigmatism, coma, etc., as well as the pupil aberrations, and exhibit a sufficiently long eye relief.

In general, wide-angle eyepiece lenses according to the invention comprise, in order from the object side to the eye side, a first lens group having a positive refractive power, a second lens group comprising a concave surface facing the object side, and a third lens group having a positive refractive power. The second lens group preferably also comprises an air-contacting surface closest to the image side of any surface in the second lens group. The third lens preferably also comprises an air-contacting surface, wherein at least one of the air-contacting surface that is closest to the eye side of any surface in the second lens group and the air-contacting surface of the third lens group is aspherical.

The eyepiece lens preferably also satisfies at least one of the conditional expressions:

$$1.0 < n \cdot f / |R2| < 3.5$$

$$0.5 < f1/f < 1.5$$

wherein R2 is the curvature radius of the concave surface of the second lens group, n is the refractive index (relative to d-line light) of the lens in the second lens group having the concave surface, f is the overall focal length of the eyepiece lens, and f1 is the focal length of the first lens group.

The eyepiece lens more preferably satisfies the conditional expression:

$$1.5 < n \cdot f / r2 |$$

and/or the following conditional expression:

$$0.7 < f1/f < 1.3$$

The first lens group can comprise a positive lens having a strong positive refractive power attributable mainly to the surface of the lens facing the eye side. The second lens group can comprise a negative meniscus lens having a concave surface facing the object side. Such a negative meniscus lens preferably comprises the concave surface facing the object side and that preferably contacts air, cemented to a positive lens having a strong positive refractive power attributable mainly to the surface of the lens facing the eye side. Such an eyepiece preferably also satisfies the conditional expression:

$$0.3 < d(1/|R1|+1/|R2|) < 0.7$$

wherein R1 is the curvature radius of the surface (facing the image side) of the negative lens of the negative meniscus lens of the second lens group, and d is the axial distance between the negative lens of the negative meniscus lens and the positive lens of the first lens group. Such an eyepiece lens also preferably satisfies the conditional expression:

$$0.4 < d(1/|R1+1/|R2|) < 0.6$$

The positive lens of the first lens group can be bi-convex, plano-convex, or a meniscus lens.

The foregoing and other objects, features, and advantages of the invention will become more apparent from the following detailed description of preferred embodiments which proceeds with reference to the accompanying drawings.

DETAILED DESCRIPTION

Figure 1:
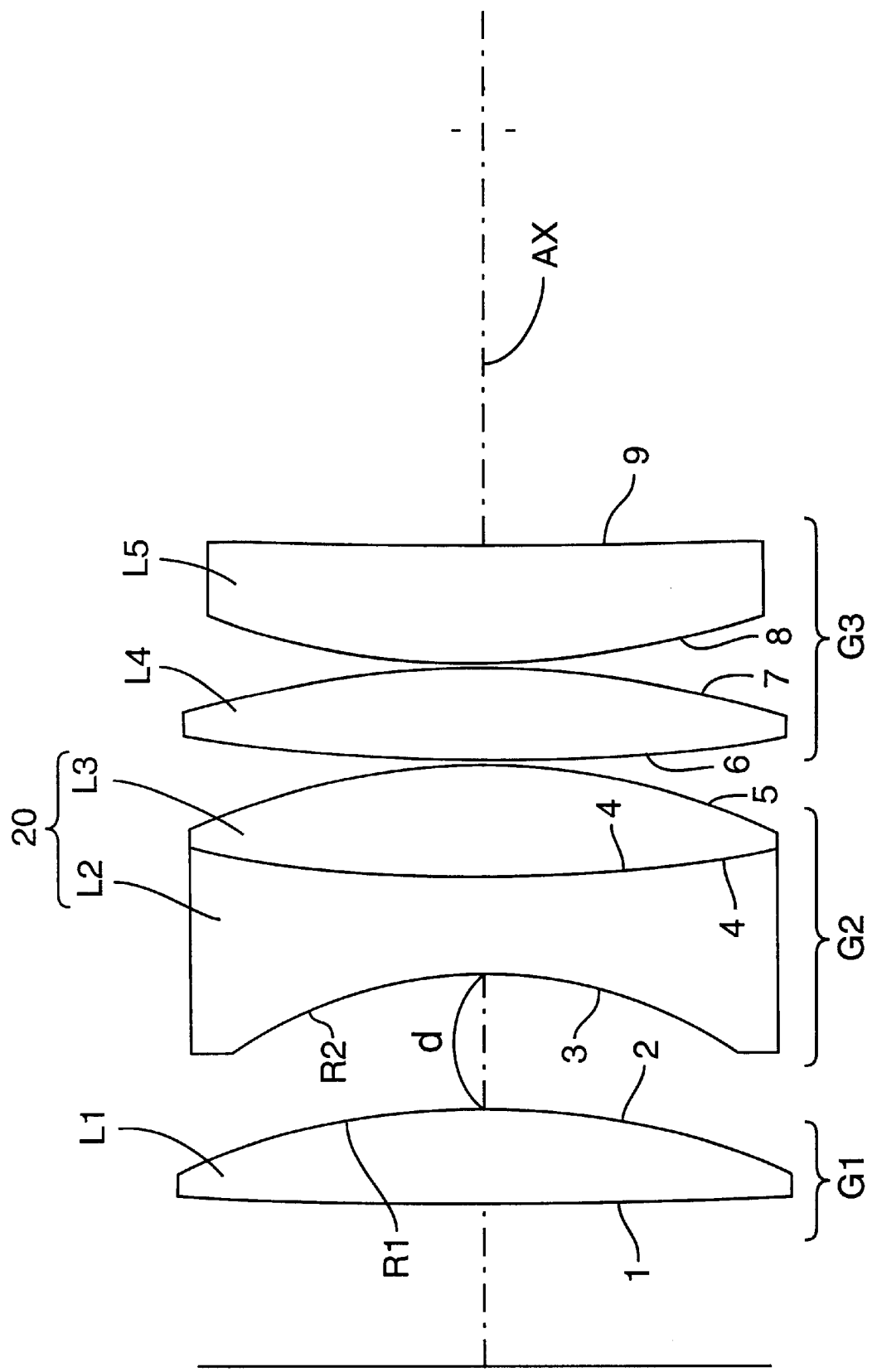
FIG. 1 is a lens diagram of a first example embodiment of an eyepiece lens according to the present invention.

In general, wide-angle eyepiece lenses according to the present invention comprise, in order from the object side to the eye side along an optical axis, a first lens group G1 having a positive refractive power, a second lens group G2 having a concave surface facing the object side (i.e., toward the objective lens), and a third lens group G3 having a positive refractive power.

At least one of an air-contacting surface of the second lens group G2 (the air-contacting surface being on the end of the second lens group closest to the eye side) and an air-contacting surface of the third lens group G3 is aspherical. Such an arrangement allows excellent correction of both the inherent aberrations and the pupil aberrations of the eyepiece lens to the edge of the field of view, and can provide a sufficiently long eye relief.

Generally, the sine condition must be fulfilled in order to correct the coma of an eyepiece lens. With a lens configuration of only spherical surfaces, it is difficult to fulfill the sine condition while also correcting distortion and astigmatism. In eyepiece lenses according to this invention, distortion, astigmatism, and pupil aberrations are corrected by the concave surface, facing the object side and contacting air, of the lens group G2. Coma is corrected by making the surface of the second lens group closest to the eye side (which surface contacting air and having a relatively large numerical aperture), and/or an air-contacting surface of the third lens group, an aspherical surface.

In addition, it is preferable to fulfill the following conditional expressions:

$$1.0 < n \cdot f / |R2| < 3.5 \tag{1}$$

$$0.5 < f1/f < 1.5 \tag{2}$$

wherein R2 is the curvature radius of the concave surface (facing the object side and contacting air) in the second lens group G2; n is the refractive index (relative to d-line light) of the glass in which the concave surface is formed; f is the overall focal length of the eyepiece lens; and f1 is the focal length of the first lens group G1.

Conditional Expression (1) stipulates conditions for providing a well-balanced correction of distortion and spherical aberration of the pupil. If the value of n·f/|R2| is below the stated lower limit, then distortion correction is inadequate. If the upper limit is exceeded, then spherical aberration of the pupil is excessively difficult to correct. When considered in light of correcting other aberrations, the lower limit of Conditional Expression (1) is preferably 1.5 or greater and the upper limit is 2.8 or less.

Conditional Expression (2) stipulates values of the focal-length ratio (f1/f) appropriate for correcting the various aberrations to the edge of the field of view while maintaining an adequately long eye relief. If the focal-length ratio is below the lower limit, then correcting spherical aberration of the pupil and coma are excessively difficult to correct. If the focal-length ratio exceeds the upper limit, then a sufficiently long eye relief cannot be maintained. When considered in light of correcting other aberrations, it is most preferable that the lower limit of Conditional Expression (2) be 0.7 or greater, and that the upper limit be 1.3 or less.

When minimizing the lens radii and adequately correcting the various aberrations are considered, the first lens group G1 preferably comprises a lens L1 with a convex surface (facing the eye side) of which the absolute value of the curvature radius is smaller than the absolute value of the curvature radius of the other surface of lens L1. Also, the second lens group G2 preferably comprises a cemented negative meniscus lens having a concave surface facing the object side (i.e., toward the objective lens). The negative meniscus lens comprises a negative lens L2 having a concave surface facing the object side (i.e., toward the objective lens) and contacting air, and a positive lens L3 having a convex surface facing toward the eye side. The lenses L2 and L3 are cemented together. It is preferable for an eyepiece lens having such a configuration to fulfill the following Conditional Expression:

$$0.3 < d(1/|R1| + 1/|R2|) < 0.7 \tag{3}$$

wherein R1 is the curvature radius of the surface of the lens L1 facing the eye side, and d is the axial distance between the lens L1 and the lens L2.

It is also preferable, in order to achieve better correction of chromatic aberrations and chromatic aberration of the pupil, to construct the lens L2 of flint glass and L3 of crown glass.

If the upper limit of Conditional Expression (3) is exceeded, then higher orders of distortion and spherical aberration of the pupil arise, making distortion of the image extremely apparent at the edge of the field of view, and producing refraction of light rays at the edges. This makes it difficult to simultaneously view the entire field of view. Conversely, if the value of Conditional Expression (3) is below the lower limit, then distortion and coma are inadequately corrected. When considered in light of correcting other aberrations, it is most preferable for the lower limit of Conditional Expression (3) to be 0.4 or greater and for the upper limit to be 0.6 or less.

In accordance with the principles described above, four example embodiments are described in detail below. In the various example embodiments below, the aspherical surfaces are expressed by the following equation:

$$S(y) = (y^2/R)/[1 + (1 - \kappa \cdot y^2/R^2)^{1/2}] + C_2 \cdot y^2 + C_4 \cdot y^4 + C_6 \cdot y^6 + C_8 \cdot y^8 + C_{10} \cdot y^{10} +$$

wherein y is the height, in a direction perpendicular to the optical axis, of a subject point on the surface; S(y) is the amount of displacement of the surface in a direction parallel to the optical axis at height y (i.e., "sag"); R is the baseline curvature radius of the surface; κ is the conical coefficient; and $C_n$ is an aspherical coefficient of the nth order. The paraxial curvature radius r of the aspherical surface may be expressed by the following equation:

$$r = 1/(2 \cdot C_2 + 1/R)$$

In the lens tables of the various example embodiments, aspherical surfaces are denoted by an asterisk (*) to the right of the respective surface number.

The following Example Embodiments are intended to illustrate the best mode now known for practicing the invention and are not intended to be limiting in any way.

EXAMPLE EMBODIMENT 1

FIG. 1 is a lens diagram of this example embodiment, showing the profiles of constituent lenses of lens groups G1, G2, G3 arranged in order (from the object side to the eye side) along an optical axis AX.

The first lens group GI has a positive refractive power and comprises a biconvex lens L1 having surfaces 1 and 2, of which surface 2 is more strongly convex and faces the eye side. As will be seen in the other example embodiments below, the lens L1 may also be a plano-convex lens having a planar surface facing the object side, or a positive meniscus lens with a concave surface facing the object side.

The second lens group G2 comprises a cemented negative meniscus lens 20 with a concave surface 3 facing the object side (toward the objective lens). The cemented negative meniscus lens 20 comprises a negative lens L2 and a positive lens L3. The negative lens L2 is a bi-concave lens, and includes the concave surface 3 and a concave surface 4. The absolute value of the curvature radius of the concave surface 3 is smaller than the absolute value of the curvature radius of surface 4. The positive lens L3 is bi-convex and includes a convex surface 5 facing the eye side. The absolute value of the curvature radius of surface 5 is smaller than the absolute value of the curvature radius of the surface 4. The lenses L2 and L3 are cemented together at a common surface 4.

The third lens group G3 has a positive refractive power and comprises two lenses L4, L5. The lens L4 is bi-convex and has a convex surface 6 facing the object side and a convex surface 7 facing the eye side. The absolute value of the curvature radius (or baseline curvature radius if aspherical) of surface 7 is smaller than the absolute value of the curvature radius of the surface 6. The lens L5 is a positive meniscus lens with a concave surface 8 facing the object side and a convex surface 9 facing the eye side.

In the first example embodiment, surface 7 is aspherical.

The particular properties of the FIG. 1 eyepiece lens are listed in Table 1 below. In the table, the numbers in the left-most column denote surface number, beginning from the objective-lens side. Refractive indices ($n_i$) are relative to d-line light ($\lambda$=587.6 nm), and $\nu_i$ denotes the Abbe numbers.

TABLE I f = 25.0 mm  
Eye relief = 18.5 mm (when entrance pupil is infinitely far)

| Surface No. (i) | Curvature Radius ($r_i$) (mm) | Interfacial Distance ($d_i$) (mm) | Refractive Index ($n_i$) | $\nu_i$ |
|---|---|---|---|---|
| Object plane | Planar | 8.0 | | |
| 1 | 257.17 | 4.2 | 1.79668 | 45.4 |
| 2 | −35.73 | 6.1 | 1.0 | |
| 3 | −20.07 | 4.3 | 1.80518 | 25.3 |
| 4 | 70.81 | 4.9 | 1.51680 | 64.1 |
| 5 | −32.81 | 0.2 | 1.0 | |
| 6 | 80.51 | 4.2 | 1.71300 | 53.9 |
| 7* | −47.07 | 0.2 | 1.0 | |
| 8 | 37.08 | 5.5 | 1.74810 | 52.3 |
| 9 | 616.07 | Eye relief | | |

Figure 2:
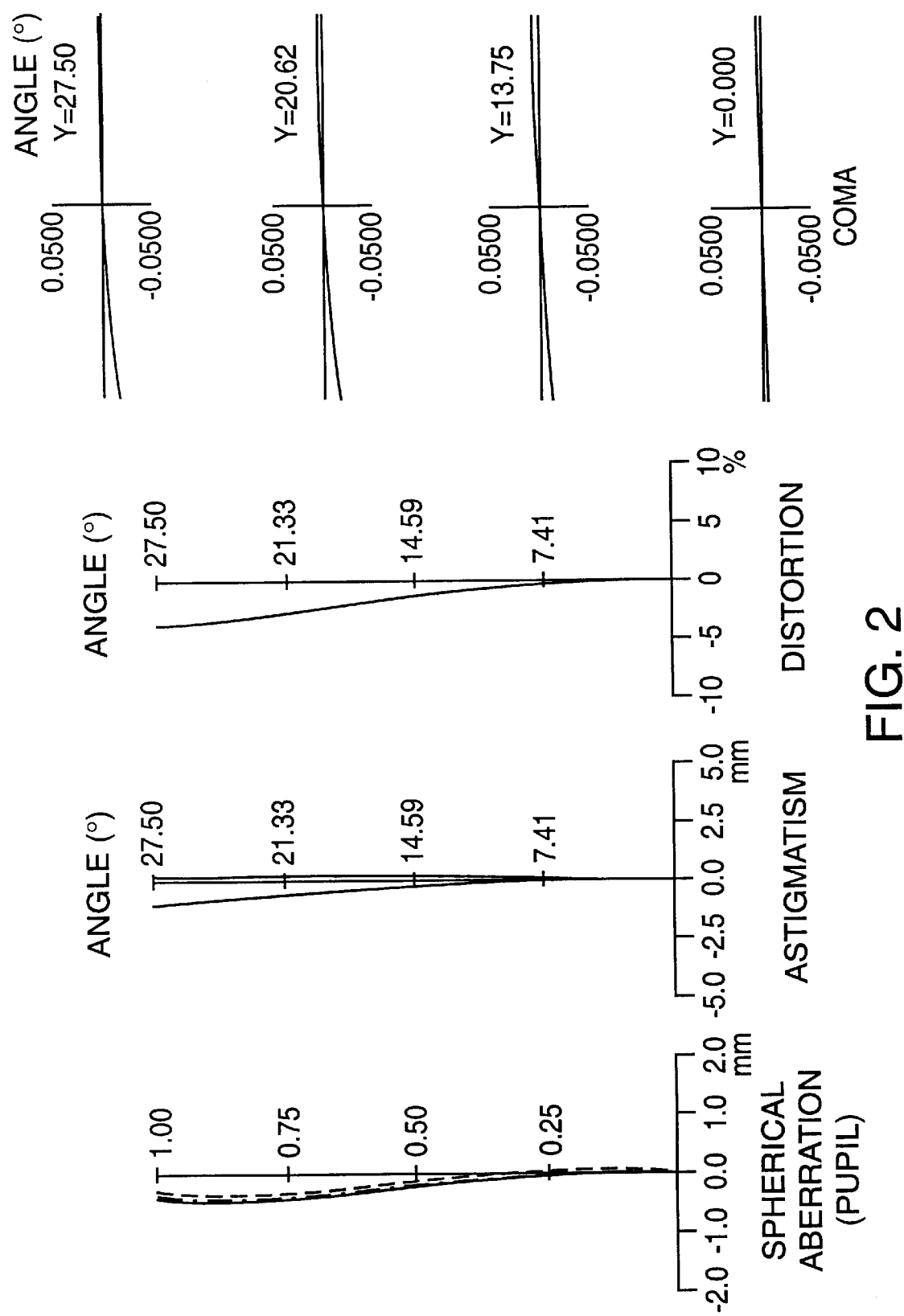
FIG. 2 depicts aberration plots for the FIG. 1 embodiment when the entrance pupil is infinitely far.
Figure 3:
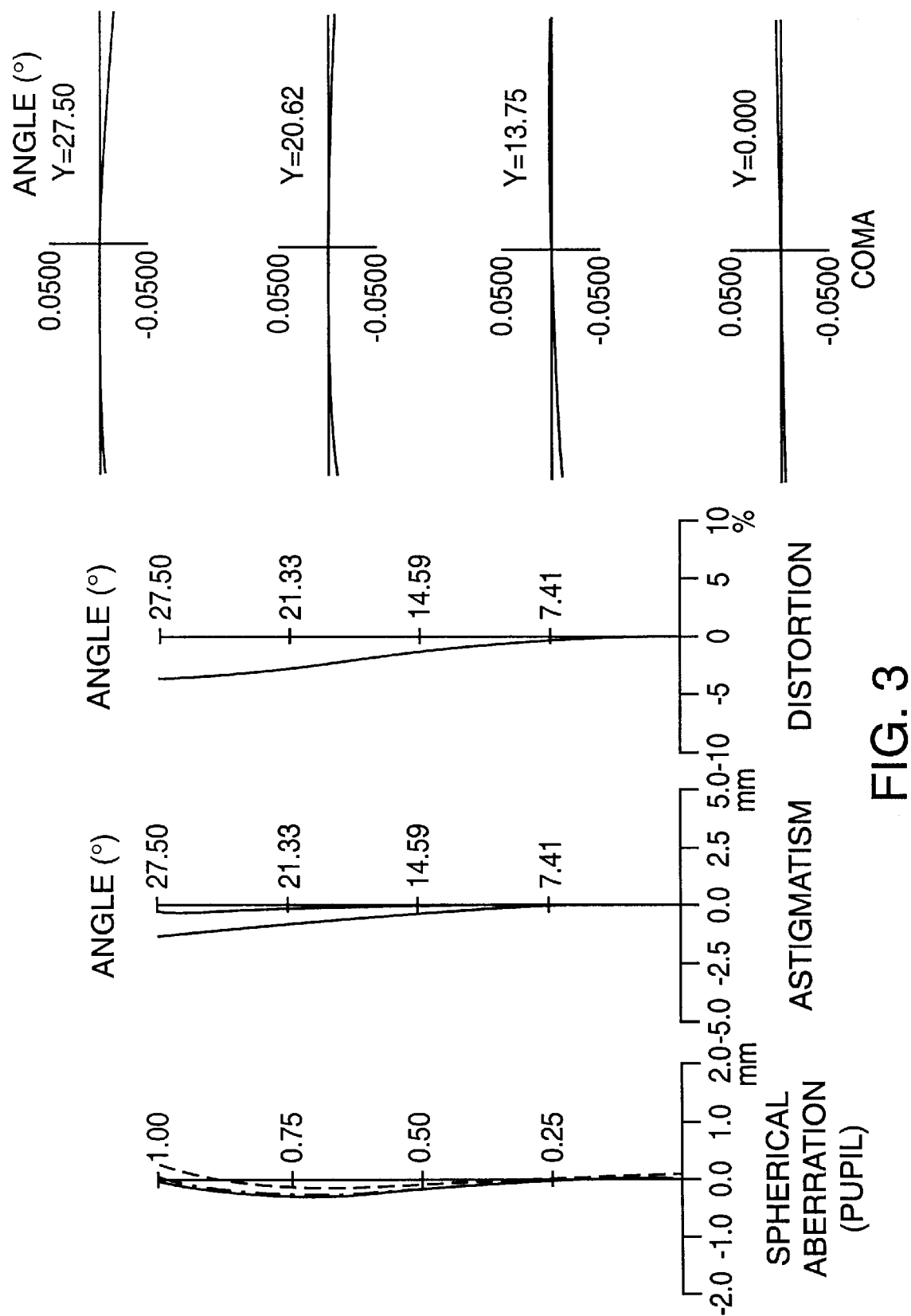
FIG. 3 depicts aberration plots for the FIG. 1 embodiment when the entrance pupil is at −400 mm.

* Aspherical Surface: $\kappa = 1.0$
$C_4 = 0.76325 \times 10^{-6}$
$C_6 = -0.16586 \times 10^{-8}$
$C_8 = -0.17018 \times 10^{-11}$
$C_{10} = 0.35023 \times 10^{-13}$ Variables for Conditional Expressions:
$f_1$ = 23.64 mm    n = 1.80518    d = 6.1 mm
R1 = −35.73 mm    R2 = −20.07 mm Plots of the spherical aberration of the pupil, astigmatism, distortion, and coma of the first example embodiment, when the entrance pupil is infinitely far, are depicted in FIG. 2. In the plots, F denotes F-line light ($\lambda$=486.13 nm), d denotes d-line light ($\lambda$=587.56 nm), and g denotes g-line light ($\lambda$=453.84 nm). Aberration conditions when the entrance pupil is at −400 mm are plotted in FIG. 3. In FIGS. 2 and 3, data pertaining to astigmatism, distortion, and coma were obtained by ray tracing in a direction toward the eye side, and data pertaining to spherical aberration of the pupil were obtained by ray tracing in a direction toward the object side. As is clear from FIGS. 2 and 3, all of the aberrations are well-corrected in this example embodiment.

EXAMPLE EMBODIMENT 2

Figure 4:
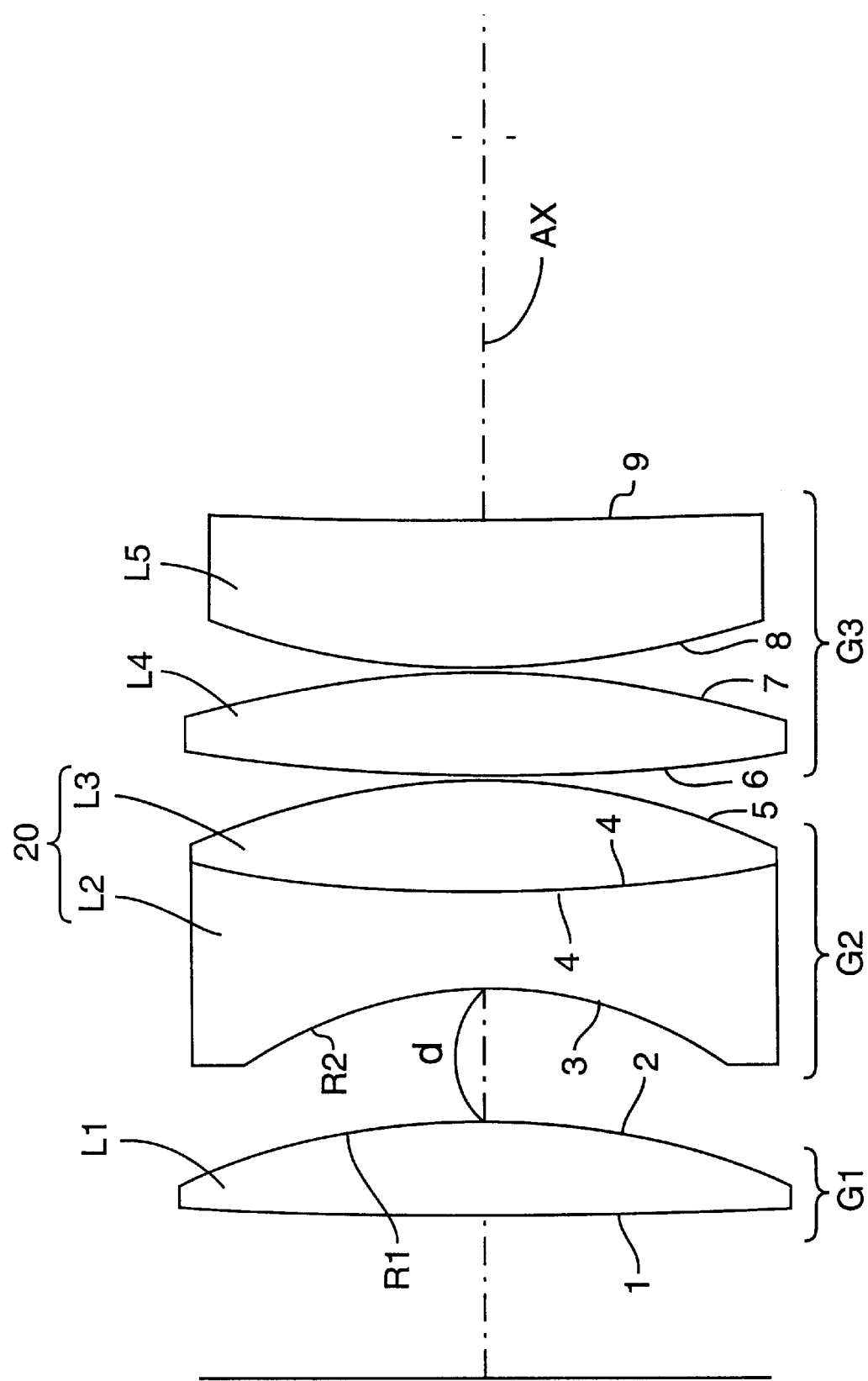
FIG. 4 is a lens diagram of a second example embodiment of an eyepiece lens according to the present invention.

FIG. 4 is a lens diagram of an eyepiece lens according to this example embodiment. The lens groups and lenses shown in FIG. 4 are as described above with respect to FIG. 1, except that (a) lens L1 is a plano-convex lens, with the planar surface (surface 1) facing the object side, and (b) surface 8 (rather than surface 7) is aspherical.

The particular properties of the FIG. 4 lens are shown in Table 2 below. The various symbols in Table 2 are the same as in Table 1.

TABLE 2 f = 25.0 mm  
Eye relief = 18.5 mm (when entrance pupil is infinitely far)

| Surface No. (i) | Curvature Radius ($r_i$) (mm) | Interfacial Distance ($d_i$) (mm) | Refractive Index ($n_i$) | $\nu_i$ |
|---|---|---|---|---|
| Object plane | Planar | 8.0 | | |
| 1 | Flat | 4.1 | 1.79668 | 45.4 |
| 2 | −33.01 | 5.7 | 1.0 | |
| 3 | −19.86 | 4.2 | 1.80518 | 25.3 |
| 4 | 67.15 | 5.2 | 1.51680 | 64.1 |
| 5 | −33.06 | 0.2 | 1.0 | |
| 6 | 69.29 | 4.6 | 1.71300 | 53.9 |
| 7 | −46.43 | 0.2 | 1.0 | |
| 8* | 36.87 | 6.9 | 1.74810 | 52.3 |
| 9 | 267.45 | Eye relief | | |

Figure 5:
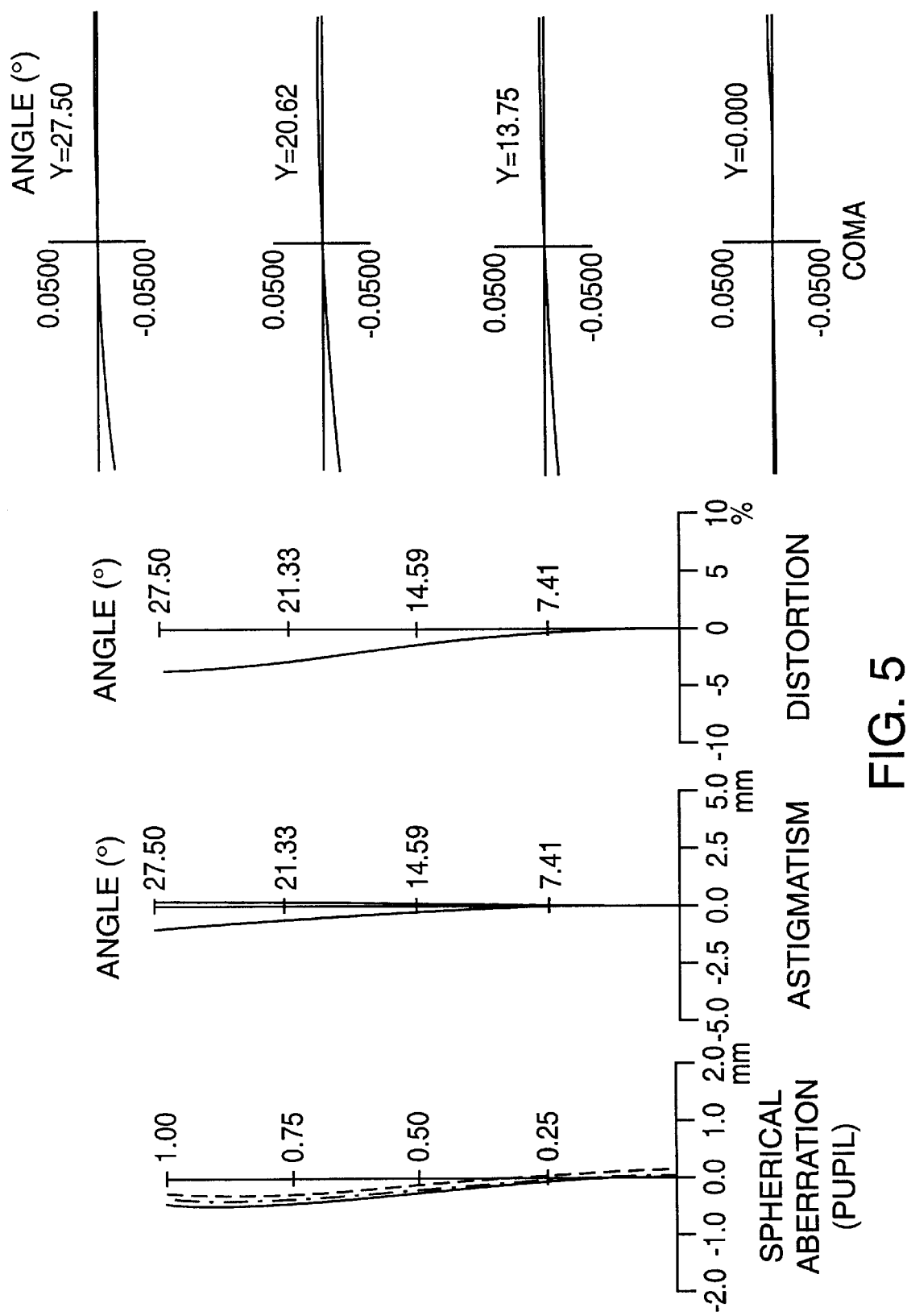
FIG. 5 depicts aberration plots for the FIG. 4 embodiment when the entrance pupil is infinitely far.
Figure 6:
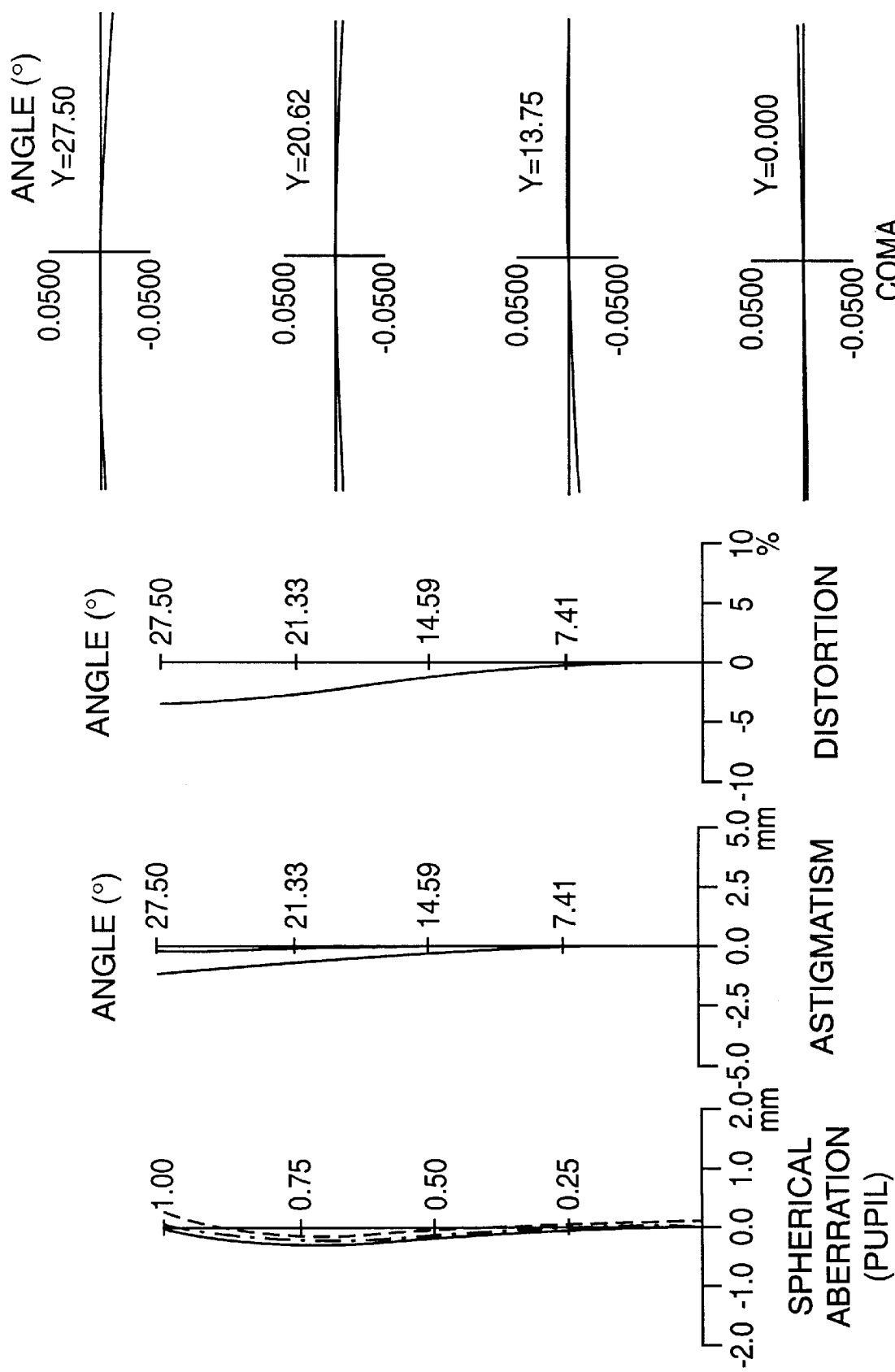
FIG. 6 depicts of aberration plots for the FIG. 4 embodiment when the entrance pupil is at −400 mm.

* Aspherical Surface: $\kappa = 1.0$
$C_4 = -0.83710 \times 10^{-8}$
$C_6 = -0.65997 \times 10^{-9}$
$C_8 = -0.46557 \times 10^{-11}$
$C_{10} = -0.38282 \times 10^{-13}$ Variables for Conditional Expressions:
$f_1$ = 23.64 mm    n = 1.80518    d = 5.7 mm
R1 = −33.01 mm    R2 = −19.86 mm The aberrations exhibited by this example embodiment, when the entrance pupil is infinitely far, are plotted in FIG. 5. The aberrations exhibited when the entrance pupil is at −400 mm are plotted in FIG. 6. Data for the plots were obtained in the same manner as in Example Embodiment 1. As is clear from FIGS. 5 and 6, all of the aberrations are well-corrected in the second example embodiment.

EXAMPLE EMBODIMENT 3

Figure 7:
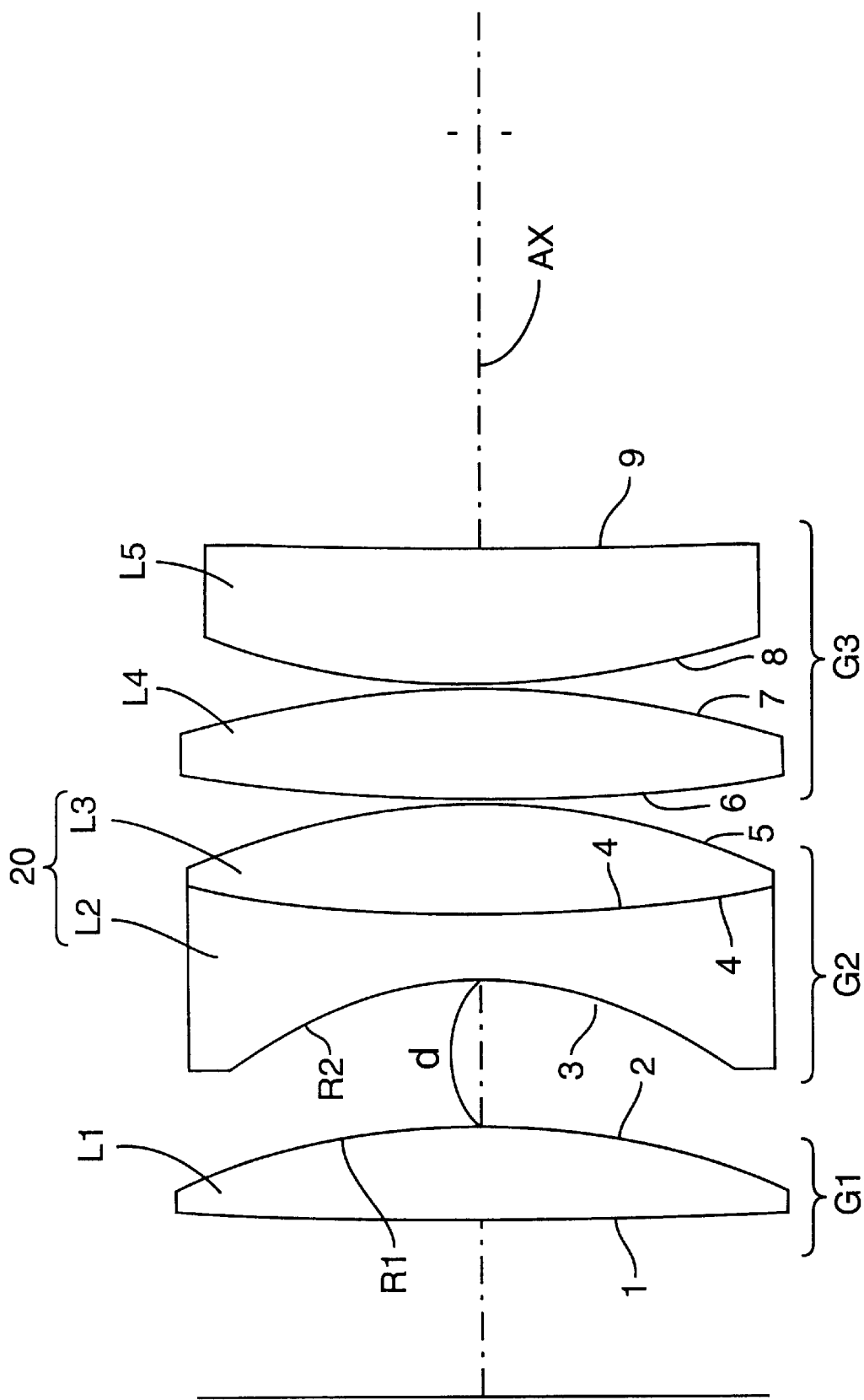
FIG. 7 is a lens diagram of a third example embodiment of an eyepiece lens according to the present invention.

FIG. 7 is a lens diagram of an eyepiece lens according to this example embodiment. The lens groups and lenses shown in FIG. 7 are as described above with respect to FIG. 1, except that: (a) lens L1 is a positive meniscus lens with a concave surface 1 facing the object side, and (b) surface 6 (rather than surface 7) is aspherical.

The particular properties of the FIG. 7 lens are shown in Table 3 below. The various symbols in Table 3 are the same as in Tables 1 and 2.

TABLE 3 f = 25.0 mm
Eye relief = 18.5 mm (when entrance pupil is infinitely far)

| Surface No. (i) | Curvature Radius ($r_i$) (mm) | Interfacial Distance ($d_i$) (mm) | Refractive Index ($n_i$) | $\nu_i$ |
|---|---|---|---|---|
| Object plane | Planar | 8.0 | | |
| 1 | −6448.03 | 4.0 | 1.79668 | 45.4 |
| 2 | −34.40 | 6.6 | 1.0 | |
| 3 | −19.11 | 2.9 | 1.80518 | 25.3 |
| 4 | 85.18 | 5.2 | 1.51680 | 64.1 |
| 5 | −29.96 | 0.2 | 1.0 | |
| 6* | 80.28 | 4.7 | 1.71300 | 53.9 |
| 7 | −40.33 | 0.2 | 1.0 | |
| 8 | 35.76 | 6.2 | 1.74810 | 52.3 |
| 9 | 184.59 | Eye relief | | |

Figure 8:
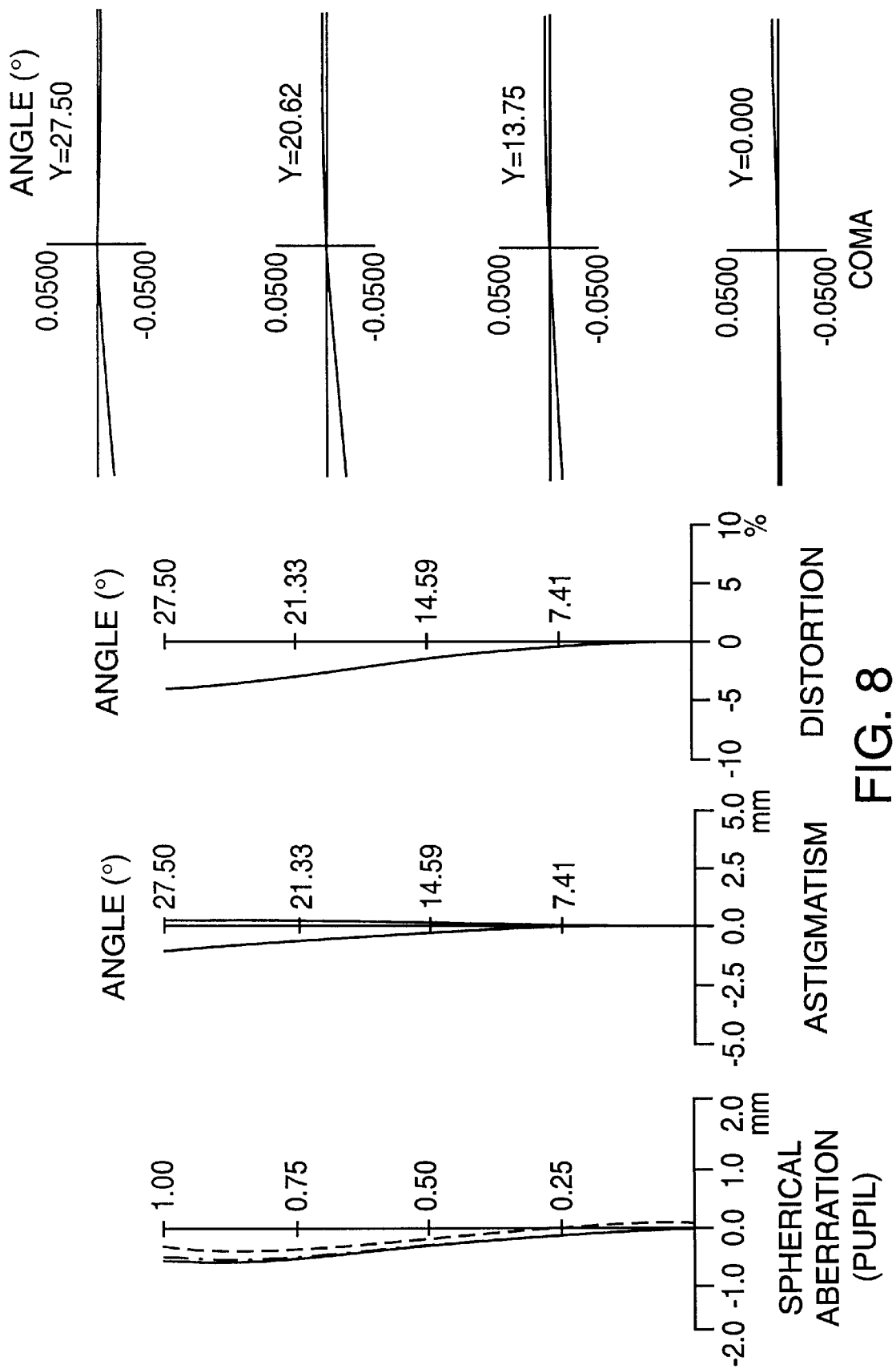
FIG. 8 depicts aberration plots for the FIG. 7 embodiment when the entrance pupil is infinitely far.
Figure 9:
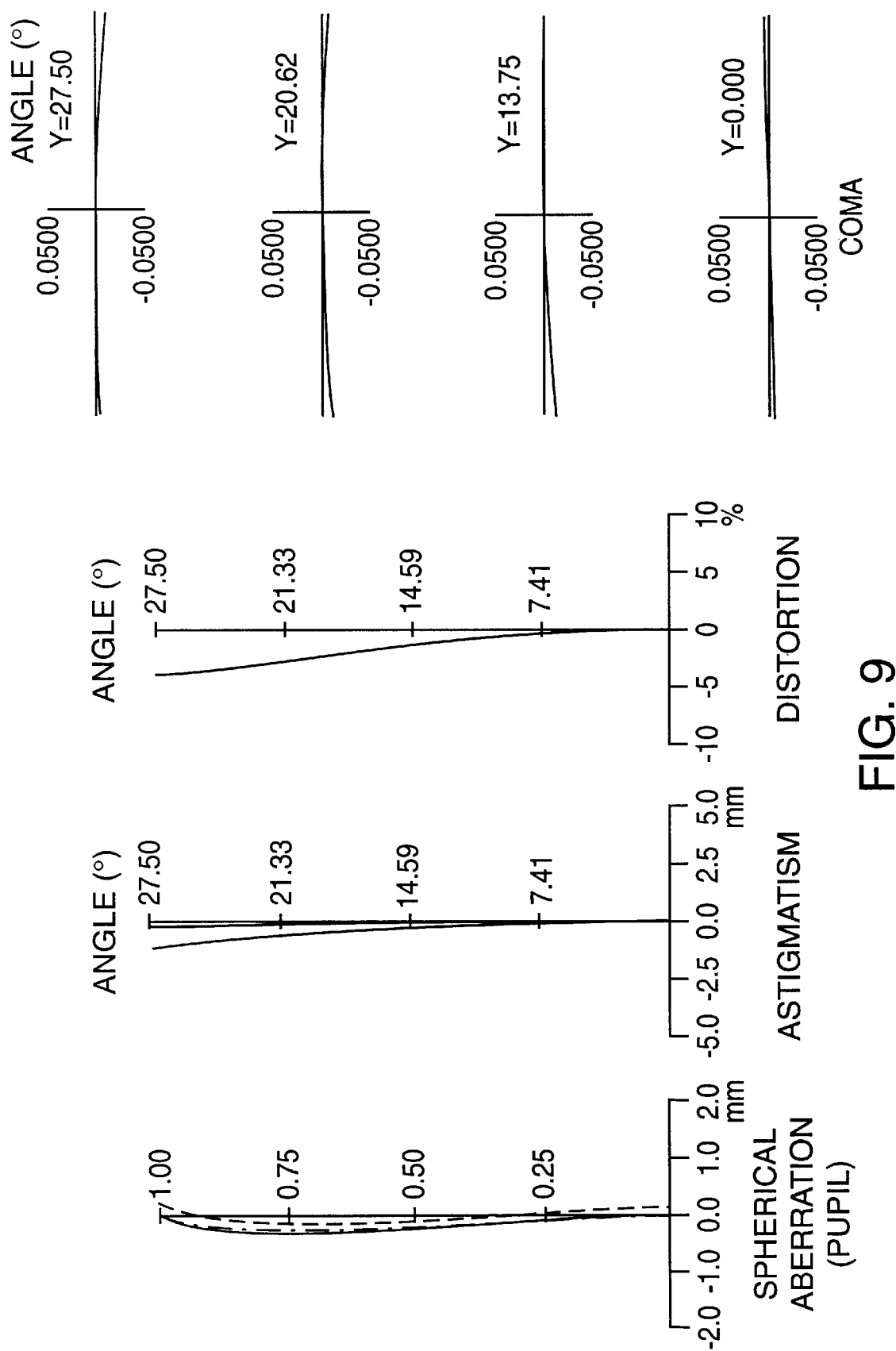
FIG. 9 depicts aberration plots for the FIG. 7 embodiment when the entrance pupil is at −400 mm.

\* Aspherical Surface: $\kappa = 1.0$
$C_4 = -0.10506 \times 10^{-5}$
$C_6 = 0.61993 \times 10^{-9}$
$C_8 = -0.52268 \times 10^{-13}$
$C_{10} = -0.19753 \times 10^{-13}$ Variables for Conditional Expressions:
$f_1 = 23.17$ mm    n = 1.80518    d = 6.6 mm
R1 = −34.40 mm    R2 = −19.11 mm The aberrations exhibited by this example embodiment, when the entrance pupil is infinitely far, are plotted in FIG. 8. The aberrations exhibited when the entrance pupil is at −400 mm are plotted in FIG. 9. The plots were obtained in the same manner as in FIGS. 2 and 3 above. As is clear from FIGS. 8 and 9, all of the aberrations are well corrected in the third example embodiment.

EXAMPLE EMBODIMENT 4

Figure 10:
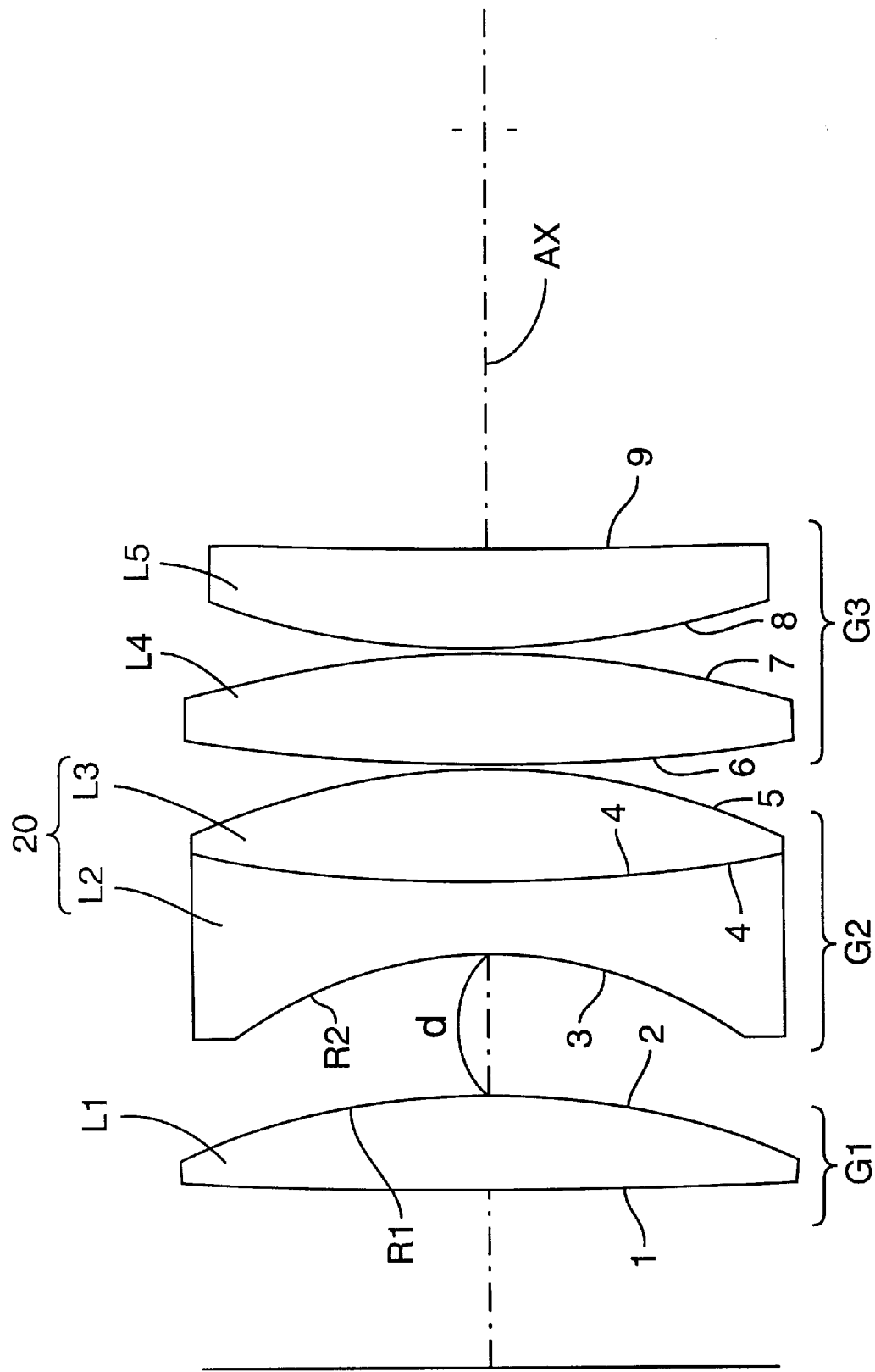
FIG. 10 is a lens diagram of a fourth example embodiment of an eyepiece lens according to the present invention.

FIG. 10 is a lens diagram of this example embodiment, in which the lens groups and lenses shown are as described above with respect to FIG. 1, except that: (a) lens L1 is a plano-convex lens with a planar surface (surface 1) facing the object side, and (b) surface 5 (rather than surface 7) is aspherical.

The particular properties of the FIG. 10 lens are shown in Table 4 below. The various symbols in Table 4 are the same as in Tables 1–3.

TABLE 4 f = 25.0 mm
Eye relief = 18.5 mm (when entrance pupil is infinitely far)

TABLE 4-continued

| Surface No. (i) | Curvature Radius ($r_i$) (mm) | Interfacial Distance ($d_i$) (mm) | Refractive Index ($n_i$) | $\nu_i$ |
|---|---|---|---|---|
| Object plane | Planar | 8.0 | | |
| 1 | Planar | 4.1 | 1.79668 | 45.4 |
| 2 | −33.07 | 5.9 | 1.0 | |
| 3 | −19.10 | 3.3 | 1.80518 | 25.3 |
| 4 | 74.53 | 5.2 | 1.51680 | 64.1 |
| 5* | −31.28 | 0.2 | 1.0 | |
| 6 | 86.33 | 4.8 | 1.71300 | 53.9 |
| 7 | −39.73 | 0.2 | 1.0 | |
| 8 | 39.75 | 4.5 | 1.74810 | 52.3 |
| 9 | 538.62 | Eye relief | | |

Figure 11:
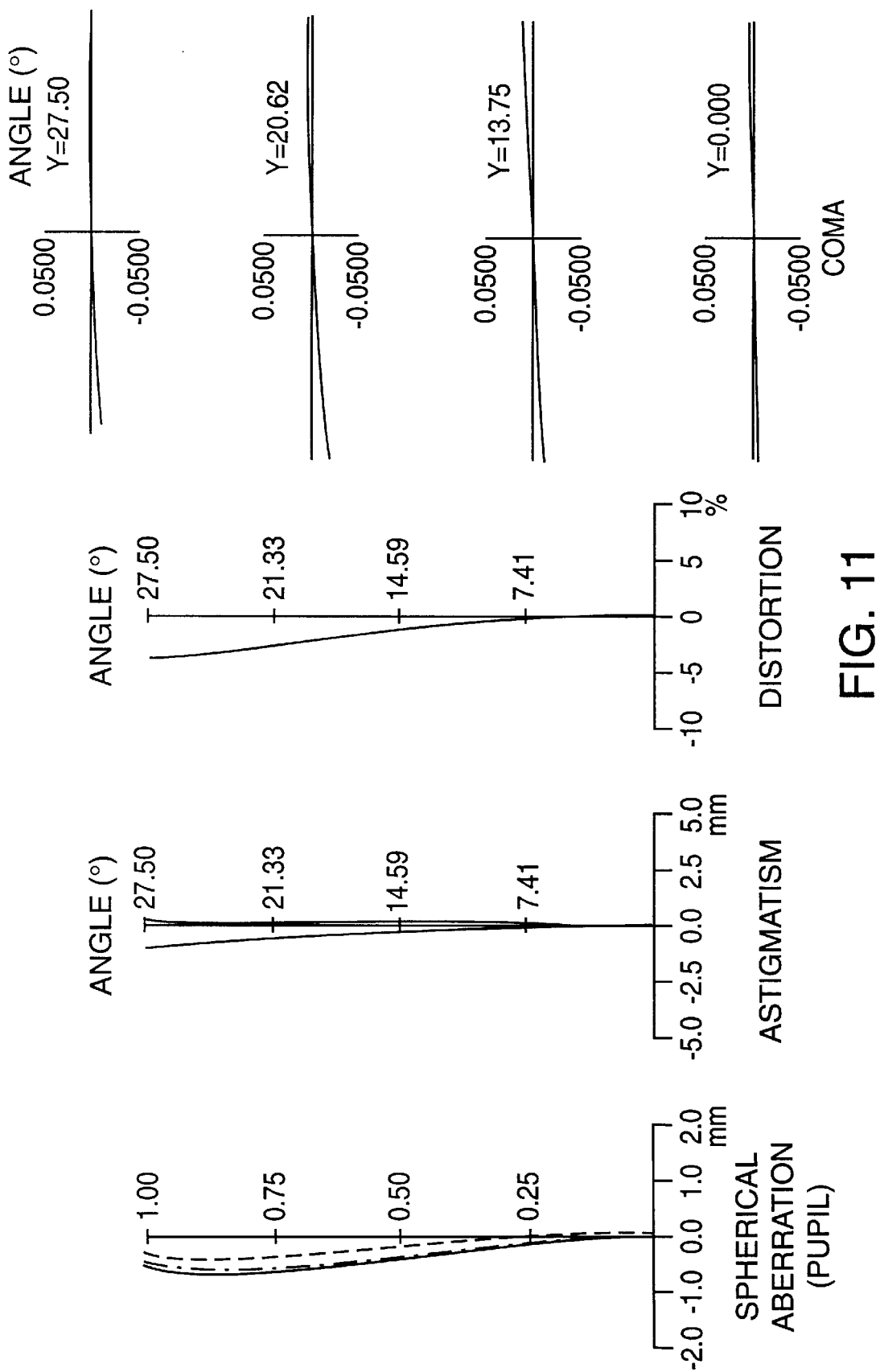
FIG. 11 depicts aberration plots for the FIG. 10 embodiment when the entrance pupil is infinitely far.
Figure 12:
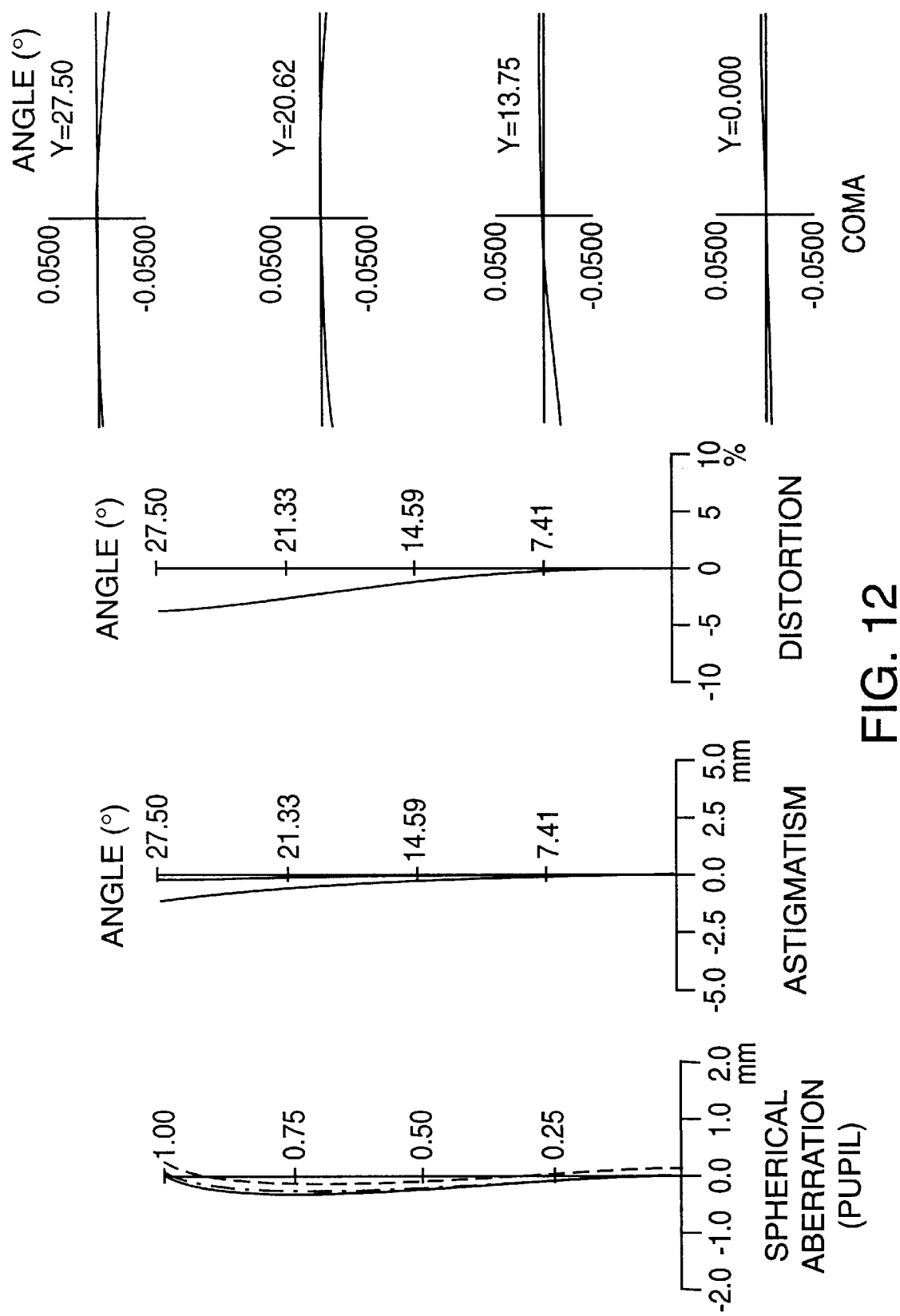
FIG. 12 depicts aberration plots for the FIG. 10 embodiment when the entrance pupil is at −400 mm.

\* Aspherical Surface: $\kappa = 1.0$
$C_4 = 0.29489 \times 10^{-5}$
$C_6 = -0.76948 \times 10^{-8}$
$C_8 = 0.60684 \times 10^{-11}$
$C_{10} = 0.14388 \times 10^{-12}$ Variables for Conditional Expressions:
$f_1 = 23.32$ mm    n = 1.80518    d = 5.9 mm
R1 = −33.07 mm    R2 = −19.10 mm The aberrations exhibited by the fourth example embodiment, when the entrance pupil is infinitely far, are plotted in FIG. 11. The aberration conditions exhibited when the entrance pupil is at −400 mm are plotted in FIG. 12. The plots were obtained in the same manner as in FIGS. 2 and 3 above. As is clear from FIGS. 11 and 12, all of the aberrations are well corrected in the fourth example embodiment.

Values of the variables used in Conditional Expressions (1)–(3) are listed for each example embodiment in Table 5 below:

TABLE 5

| Embodiment No. | f1 (mm) | f (mm) | n | d (mm) | R1 (mm) | R2 (mm) |
|---|---|---|---|---|---|---|
| 1 | 23.64 | 25.00 | 1.80518 | 6.1 | −35.73 | −20.07 |
| 2 | 23.46 | 25.00 | 1.80518 | 5.7 | −33.01 | −19.86 |
| 3 | 23.17 | 25.00 | 1.80518 | 6.6 | −34.40 | −19.11 |
| 4 | 23.32 | 25.00 | 1.80518 | 5.9 | −33.07 | −19.10 |

The values of the Conditional Expressions (1)–(3) for the various embodiments are listed in Table 6 below:

TABLE 6

| Embodiment No. | Conditional Expression | | |
|---|---|---|---|
| | (1) | (2) | (3) |
| 1 | 2.25 | 0.95 | 0.47 |
| 2 | 2.27 | 0.94 | 0.46 |
| 3 | 2.36 | 0.93 | 0.54 |
| 4 | 2.36 | 0.93 | 0.49 |

As can be ascertained from the foregoing, wide-angle eyepiece lenses according to the present invention, by conforming to the configuration and conditions discussed above, are able to simultaneously and excellently correct inherent eyepiece lens aberrations, such as distortion, astigmatism, coma, and others, and aberrations of the pupil, while also providing adequately long eye relief, enabling viewing with superior imaging performance.

Having illustrated and demonstrated the principles of the invention, it should be apparent to those skilled in the art that the embodiments of the invention can be modified in arrangement and detail without departing from such principles. I claim as the invention all that comes within the scope of the following claims.

What is claimed is:

1. A wide-angle microscope eyepiece lens comprising, in order from the object side to the eye side:

(a) a first lens group having a positive refractive power;

(b) a second lens group comprising a lens having a concave surface facing the object side, and comprising an air-contacting surface at an end of the second lens group closest to the eye side; and (c) a third lens group having a positive refractive power and comprising a surface contacting air, wherein at least one of the air-contacting surface at the end of the second lens group closest to the image side and the air-contacting surface of the third lens group is aspherical, the eyepiece lens satisfying the conditional expressions:

$$1.0 < n \cdot f/|R2| < 3.5, \text{ and } 0.5 < f1/f < 1.5,$$

wherein R2 is the curvature radius of the concave surface of the second lens group, n is the refractive index (relative to d-line light) of the lens in the second lens group having the concave surface, f is the overall focal length of the eyepiece lens, and f1 is the focal length of the first lens group.

2. The eyepiece lens of claim 1, wherein the air-contacting surface at the end of the second lens group closest to the eye side is aspherical.

3. The eyepiece lens of claim 2, wherein only the air-contacting surface at the end of the second lens group closest to the eye side is aspherical.

4. The eyepiece lens of claim 1, wherein the air-contacting surface of the third lens group is aspherical.

5. The eyepiece lens of claim 4, wherein only the air-contacting surface of the third lens group is aspherical.

6. The wide-angle eyepiece lens of claim 1, satisfying the conditional expression:

$$1.5 < n \cdot f/|R2| < 2.8.$$

7. The wide-angle eyepiece lens of claim 1, further satisfying the conditional expression:

$$0.7 < f1/f < 1.3.$$

8. A wide-angle microscope eyepiece lens comprising, in order from the object side to the eye side:

(a) a first lens group having a positive refractive power;

(b) a second lens group comprising a lens having a concave surface facing the object side, and comprising an air-contacting surface at an end of the second lens group closest to the eye side; and (c) a third lens group having a positive refractive power and comprising a surface contacting air, wherein at least one of the air-contacting surface at the end of the second lens group closest to the image side and the air-contacting surface of the third lens group is aspherical, the eyepiece lens satisfying the conditional expressions:

$$1.0 < n \cdot f/|R2| < 3.5, \text{ and } 0.5 < f1/f < 1.5,$$

wherein R2 is the curvature radius of the concave surface of the second lens group, n is the refractive index (relative to d-line light) of the lens in the second lens group having the concave surface, f is the overall focal length of the eyepiece lens, and f1 is the focal length of the first lens group, and wherein the first lens group comprises a positive lens having a strong positive refractive power attributable mainly to the surface thereof facing the eye side, the second lens group comprises a negative meniscus lens having a concave surface facing the object side, the negative meniscus lens comprising a negative lens comprising the concave surface facing the object side, which surface contacts air, cemented to a positive lens having a strong positive refractive power attributable mainly to the surface thereof facing the eye side, and the eyepiece lens further satisfies the conditional expression:

$$0.3 < d(1/|R1| + 1/|R2|) < 0.7$$

wherein R1 is the curvature radius of the surface, facing the eye side, of the negative lens of the negative meniscus lens of the second lens group, and d is the axial distance between the negative lens of the negative meniscus lens and the positive lens of the first lens group.

9. The wide-angle eyepiece lens of claim 8, further satisfying the conditional expression:

$$0.4 < d(1/|R1| + 1/|R2|) < 0.6.$$

10. The wide-angle eyepiece lens of claim 8, wherein the positive lens of the first lens group is bi-convex.

11. The wide-angle eyepiece lens of claim 8, wherein the positive lens of the first lens group is plano-convex.

12. The wide-angle eyepiece lens of claim 8, wherein the positive lens of the first lens group is a meniscus lens.

* * * * *

UNITED STATES PATENT AND TRADEMARK OFFICE
CERTIFICATE OF CORRECTION

PATENT NO. : 6,104,542
DATED : August 15, 2000
INVENTOR(S) : Yasuhiro Omura

Page 1 of 1

It is certified that error appears in the above-identified patent and that said Letters Patent is hereby corrected as shown below:

Column 4,
Line 60, "$C_{10}y^{10}+$" should read -- $C_{10} \cdot y^{10}+....$ --.

Column 8,
Line 19, "0.60684" should read -- 0.60584 --.

Signed and Sealed this

Twenty fifth Day of September, 2001

Attest:

*Nicholas P. Godici*

NICHOLAS P. GODICI
*Attesting Officer*  Acting Director of the United States Patent and Trademark Office